(12) United States Patent
Tokumaru et al.

(10) Patent No.: US 6,636,660 B2
(45) Date of Patent: Oct. 21, 2003

(54) MONOCHROMETER AND WAVELENGTH DIVISION MULTIPLEXER COMPRISING SAID MONOCHROMETER

(75) Inventors: Terutaka Tokumaru, Tokyo (JP); Toshihiko Takano, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 135 days.

(21) Appl. No.: 09/985,813

(22) Filed: Nov. 6, 2001

(65) Prior Publication Data

US 2002/0136488 A1 Sep. 26, 2002

(30) Foreign Application Priority Data

Nov. 9, 2000 (JP) ........................................ 2000-341836

(51) Int. Cl.[7] .................................................. G02B 5/18
(52) U.S. Cl. ........................... 385/24; 385/37; 359/563; 359/569
(58) Field of Search .............................. 385/15, 18, 24, 385/31, 37; 359/558, 563, 569

(56) References Cited

U.S. PATENT DOCUMENTS 5,080,465 A * 1/1992 Laude ........................ 359/571
6,067,197 A * 5/2000 Blasiak et al. ............... 359/571
6,097,863 A * 8/2000 Chowdhury ................. 385/37

* cited by examiner

Primary Examiner—Rodney Bovernick
Assistant Examiner—Juliana K. Kang
(74) Attorney, Agent, or Firm—Wenderoth, Lind & Ponack, L.L.P.

(57) ABSTRACT

A small-sized and low-cost wavelength division multiplexer having little insertion loss, little polarization dependence and a broad wavelength bandwidth, the wavelength division multiplexer adopting a grating configuration in which an incident light is retroreflected, exit lights from respective grooves are enhanced by interference effect in the incident direction of the light, wave surfaces of evanescent waves in the grooves are parallel to the normal direction of the grating and phases of the evanescent waves in the respective grooves agree with each other.

The wavelength division multiplexer has high diffraction efficiency in each of TM and TE polarized lights at a several-order diffraction order and accordingly has a broad wavelength bandwidth and remarkably low polarization dependence.

2 Claims, 3 Drawing Sheets

MONOCHROMETER AND WAVELENGTH DIVISION MULTIPLEXER COMPRISING SAID MONOCHROMETER

FIELD OF THE INVENTION

The present invention relates to a wavelength division multiplexer for use in a wavelength division multiplexing (WDM) transmission. Particularly, it relates to a small-sized and low-cost wavelength division multiplexer having little insertion loss and little polarization dependence and having a broad wavelength bandwidth.

RELATED ARTS OF THE INVENTION

In a WDM optical transmission, a wavelength division multiplexer combines optical signals of various wavelengths, the signal consisting of the various wavelengths is transmitted to a transmission path, and a wavelength division demultiplexer separates the optical signal received from the transmission path into respective wavelengths. In the WDM, the quantity of signals which can be transmitted by one transmission path is the product of the bandwidth of one wavelength and the divided number of the wavelength. In one wavelength, the bandwidth which can be modulated is approximately several tens of GHz under the current circumstances. For increasing the quantity of transmission, it is preferred that the divided number is large.

U.S. Pat. No. 5,748,350 (May 5, 1998) disclosed by Jing-Jong Pan et al. discloses an example concerning a wavelength division multiplexer. This publication discloses a method in which wavelengths are individually one by one separated or combined with a dielectric multilayer filter. Since the configuration of the above method is simple, it has advantages in size reduction and cost reduction. On the other hand, it is required to use dielectric multilayer filters of the same number as the number of wavelengths to be separated or combined. When a few wavelengths are separated or combined, no problem occurs. However, when several tens of wavelengths are separated or combined, the number of parts increases and a defect is that to reduce a size or reduce a cost is difficult.

Further, U.S. Pat. No. 6,112,000 (Aug. 29, 2000) disclosed by Ernest Eisenhardt Berbmann discloses a method in which wavelengths are separated or combined with AWG (Arrayed Waveguid Grating) in one lump.

This method uses the principle in which a phase contrast is generated between arrayed waveguides and the phase contrast differs depending upon a wavelength so that angle of diffraction differs. In this method, the waveguide itself is produced by an expensive semiconductor process. Further, the waveguide has a thicker film and a broader area when compared with a LSI so that very high cost is required. In the above principle, further, the speed of light propagating in each waveguide is apt to be affected by a temperature distribution. Accordingly, it is required to control a temperature with high accuracy for controlling the phase contrast between the waveguides. The defect is that its cost becomes higher.

As another example, there is used a method in which light consisting of various wavelengths is separated or combined with a grating in free space in one lump. Similarly to AWG, this method uses the principle that a phase contrast is generated with a grating, the phase contrast differs depending upon a wavelength and accordingly angle of diffraction differs. Since optical parts used are a grating and a lens which can be produced at a low cost and since the path which light passes through exists in air, almost no temperature dispersion occurs in the above principle. Accordingly, the advantage is that it is not required to control a temperature with high accuracy. The grating used in the above method has diffraction efficiency of nearly 100% in transverse magnetic (TM) polarized light having a vibrational direction of an electric field in the direction normal to grooves. However, it has low diffraction efficiency in transverse electric (TE) polarized light having a vibrational direction of an electric field in the direction parallel to the grooves. Therefore, it is required to take measures against the polarization dependence of the grating.

U.S. Pat. No. 5,886,785 (Mar. 23, 1999) disclosed by Herve Lefevre et al. proposes an example concerning a conventional technology of a wavelength division multiplexer improved in such a polarization dependence. According to this proposition, a light beam is separated with a polarization separator into a TM polarization component and a TE polarization component respectively before the beam enters a grating. Then, the TE polarized light is converted into TM polarized light with a $\lambda/2$ plate and the TM polarized light enters the grating.

Due to the use of such a system, even though light enters a wavelength division multiplexer under any polarization conditions, the polarization component entering the grating is TM polarized light alone. Accordingly, the diffraction efficiency in the grating can become almost 100%.

On the other hand, the polarization separator and the $\lambda/2$ plate are used so that the defect is that its cost becomes high.

"Dipak Chowdhurry, IEEE JOURNAL OF SELECTED TOPICS IN QUANTUM ELECTRONICS, Vol.6, No.2, pp233–239 (2000)" (to be referred to as "literature 1" hereinafter) proposes another example concerning a conventional technology of a wavelength division multiplexer improved in such a polarization dependence. According to the above literature 1, the polarization dependence is improved by using a grating having a several-tenth order of diffraction.

According to "Principle of Optics" (translated by Kusakawa et al., published by Tokai University Press, p608, to be referred to as "literature 2" hereinafter), a grating which allows radiation of a specific wavelength to center at a specific diffraction order is called "blazed grating". Generally, a grating having a remarkably low diffraction order like a several-order diffraction order, in particular a grating having the first diffraction order, is used in many cases. In contrast, a grating having a several-tenth order of diffraction is called Echelette.

According to the literature 1, Echelette shows high diffraction efficiencies of both TM polarized light and TE polarized light. However, even the above grating having a several-tenth order of diffraction does not have diffraction efficiency of nearly 100% concerning the TE polarized light. Further, a grating having such a higher diffraction order has a defect, that is, the higher the diffraction order is, the narrower the reflection bandwidth is.

As described before, concerning a wavelength division multiplexer which separates or combine light consisting of various wavelengths with a grating in free space in one lump, there can be produced a small-sized and low-priced wavelength division multiplexer which combines or separates many wavelengths, such as several tens of wavelengths. However, it is required to cope with the polarization dependence. Accordingly the defect is that a cost increase occurs or deterioration of properties such as an insertion loss, polarization dependence or wavelength bandwidth occurs.

SUMMARY OF THE INVENTION

It is an object of the present invention to provide a small-sized and low-cost wavelength division multiplexer having little insertion loss, little polarization dependence and a broad wavelength bandwidth.

According to the present invention, there is provided a monochrometer comprising a grating, in which an incident angle of light entering said grating agrees with an exit angle of a diffracted light exiting said grating, wherein said grating is composed of a plane substrate and linear grooves constructed of two facets, said linear grooves are formed on said plane substrate in regular cycles, the three angles of θa, θb and φ satisfy the relationships of the following equations 1 and 2 in which θa is the angle that the normal line to one facet of the two facets of each groove forms with the normal line to the surface of said plane substrate, θb is the angle that the normal line to the other facet of the two facets of each groove forms with the normal line to the surface of said plane substrate, and φ is the incident angle which light entering said grating forms with the normal line to the surface of said plane substrate, and said incident angle φ satisfies the following equations 3 and 4 in which m is the order of diffraction and each of $n_1$ and $n_2$ is a whole number.

$$\theta a = \pi/4 + \phi/2 \tag{1}$$

$$\theta b = \pi/4 - \phi/2 \tag{2}$$

$$\sin \phi = m/(2n_1 + m) \tag{3}$$

$$\sin \phi = m/(2n_2 - m) \tag{4}$$

According to the present invention, there is also provided a wavelength division multiplexer for use in a wavelength division multiplexing (WDM) optical transmission system which conducts communications by sending and receiving a wavelength division multiplexing (WDM) signal obtained by combining optical signals of a plurality of wavelengths, which wavelength division multiplexer comprises light input/output means to a fiber, the monochrometer recited in claim 1, and collective means disposed on an optical path between said light input/output means and the monochrometer.

DETAILED DESCRIPTION OF THE INVENTION

Figure 1:
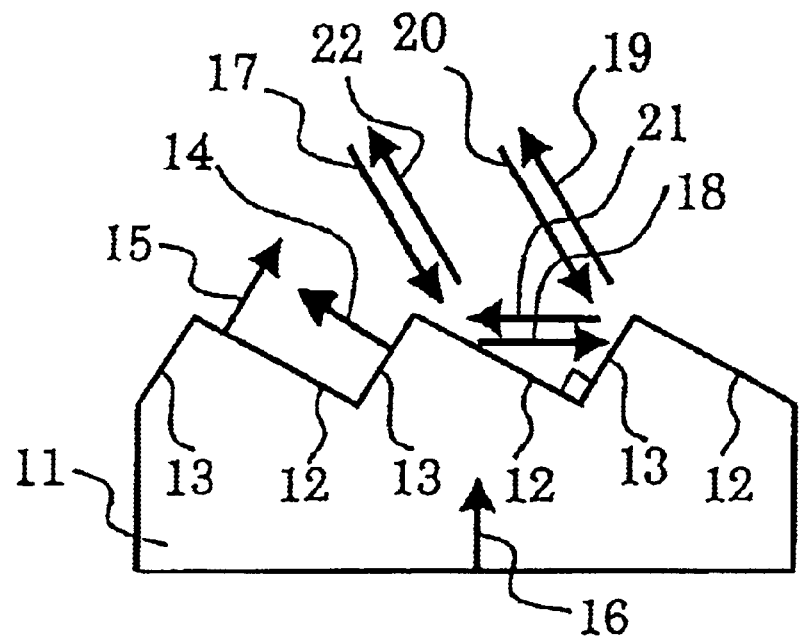
FIG. 1 is a diagrammatic illustration explaining the grating configuration of the present invention.

The present inventors have made diligent studies for developing a small-sized and low-cost wavelength division multiplexer having little insertion loss, little polarization dependence and a broad wavelength bandwidth and as a result have found that a polarization-independence type monochrometer configuration exists also in a method using a grating in free space. On the basis of the above finding, the present inventors have reached the present invention.

The configuration of the present invention will be explained hereinafter.

In order to facilitate understanding, first, actions in a blazed grating used in a conventional monochrometer configuration will be explained. Next, the monochrometer of the present invention will be explained with regard to differences of actions between the monochrometer of the present invention and the blazed grating with reference to figures respectively.

In the present invention, symbols in the drawings have the following meanings; 11: grating, 12 and 13: inclined facets forming a groove, 14: the direction of the normal to inclined facet 13, 15: the direction of the normal to inclined facet 12, 16: the direction of the normal to grating 11, 17 and 20: incident lights, 18 and 21: evanescent lights, 19 and 22: diffracted lights, 23: grating, 24 and 25: inclined facets forming a groove, 26: the direction of the normal to inclined facet 24, 27: the direction of the normal to inclined facet 25, 28: the direction of the normal to grating 23, 29: incident light, 30: diffracted light, 31: TM polarized light, 32: TE polarized light, 33: an incident point of incident light beam 17 into inclined facet 12, 34: an incident point of incident light beam 20 into inclined facet 13, 35: material for grating, 36: resin layer, 37: metal thin film, 41: light input/output means, 42: monochrometer, 43: collective means, 44: fiber tape, 45 divergent light from light input/output means, 46: collimate light after passing through the collective means, 47: collimate light exiting grating and 48: convergent light after passing through the collective means.

Figure 2:
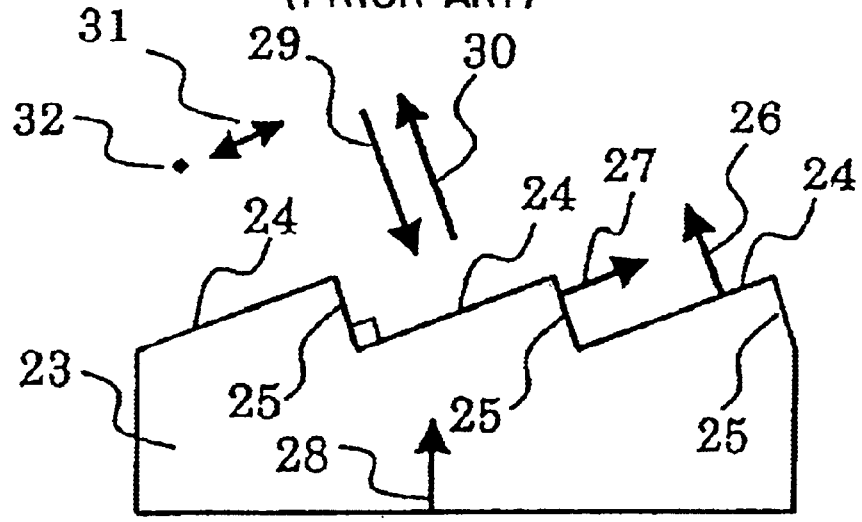
FIG. 2 is a diagrammatic illustration explaining a conventional grating configuration.

FIG. 2 is a drawing for explaining a conventional blazed grating and it is an enlarged view of part of cross section of a blazed grating (23). In the blazed grating (23), a groove consists of two facets of a facet (24) and a facet (25). The normal direction of the facet (24) is set such that an incident direction (29) of light agrees with an exit direction (30) of a diffracted light. Such a configuration in which the direction of an incident light agrees with the direction of a diffracted light is called "Littrow's Mounting Configuration".

In the Littrow's Mounting Configuration, the relationship between a wavelength: λ and a groove pitch: p (the same length unit as wavelength λ) is set such that reflection wave from one groove and reflection wave from another groove are mutually enhanced in an incident and exit direction (29,30) of light due to an interference action.

The equation of the above relationship is represented by the following equation 5.

In equation 5, φ is the angle which the incident direction (29) of light forms with the normal direction (28) of a grating and m is order of diffraction.

$$\sin \phi = m\lambda/(2p) \tag{5}$$

When TM polarized light (31) enters in the blazed grating (23), the diffraction efficiency is remarkably high. In particular, when metal having a remarkably high reflectance to an infrared light, such as gold, is deposited on the surface of a groove, the diffraction efficiency is almost 100%.

However, when the order of diffraction is small, the diffraction efficiency of TE polarized light (32) is approximately 50 to 60%.

The reason why such a polarization dependence occurs is estimated as follows. With regard to the TM polarized light (31), almost no influence by the facet (25) is present since the phases of an incident wave and a reflection wave on the facet (25) agree with each other. In contrast, with regard to the TE polarized light (32), the phases of an incident wave and a reflection wave on the facet (25) differ from each other by π. Accordingly, there is generated an electromagnetic wave component emanating centrally in the normal direction (27) of the facet (25), which generates a diffraction light of other diffraction order near to the normal direction (27) of the facet (25). As a result, the diffraction efficiency at an intended order decreases.

The literature 1 mentioned before discloses a method for overcoming a diffraction efficiency deterioration of the TE polarized light (32) by the completely same optical principle as the principle of the blazed grating (23). While the grating of the literature 1 uses the completely same optical principle as the principle of the blazed grating, it is an Echelette in which the order of diffraction is a several-tenth order. The reason why the diffraction efficiency of the TE polarized light (32) is high in this Echelette is estimated as follows. The length to which the influence of the facet (25) reaches from the facet (25) is approximately several times as long as a wavelength. Since the length of a groove pitch increases in proportion to the diffraction order, a grating having a large diffraction order like echelette has a relatively smaller effect of the influence of the facet (25) so that the diffraction efficiency of an intended order is improved.

Next, the polarization-independence type monochrometer configuration found by the present inventors will be explained. FIG. 1 is an enlarged cross-sectional view of part of a grating in the monochrometer of the present invention.

In a grating (11) in FIG. 1, a facet (12) reflects a light beam (17) entering the facet (12) to give a light beam (18) in the grating. The light beam (18) enters the other facet (13) and the facet (13) reflects the light beam (18) to give an exit light beam (19). On the other hand, the facet (13) reflects a light beam (20) entering the facet (13) to give a light beam (21) in the grating. The light beam (21) enters the other facet (12) and the facet (12) reflects the light beam (21) to give an exit light beam (22).

In the conventional grating configuration, when the angle (blaze angle) which the normal direction (26) of a facet (24) forms with the normal direction (28) of a grating agrees with the angle which an incident light beam (29) forms with the normal direction (28) of a grating, that is, when the normal direction (26) of the facet (24) is in parallel with the direction of the incident light beam (29), excellent properties are obtained.

In contrast, the monochrometer of the present invention exhibits excellent properties when the relationships represented by equations 1 to 4 are satisfied. As a result, the monochrometer configuration of the present invention gives very high diffraction efficiencies of both TM and TE polarized lights.

The reason therefor is estimated as follows.

In the grating configuration of the present invention, the angle which the normal direction (15) of the facet (12) forming a groove forms with the normal direction (16) of a grating is θa, the angle which the normal direction (14) of the facet (13) forms with the normal direction (16) of a grating is θb and the angle which the incident beam light (17,20) forms with the normal direction (16) of a grating is φ. In this case, when the relationships of the above three angles satisfy equations 1 and 2, the angle which the two facets forming a groove form with each other is just 90° and light beams (18,21) in the grating are in the direction parallel to the grating.

Therefore, a light beam entering either the facet (12) or the facet (13) is reflected by one facet and then inevitably enters the other facet. Accordingly, all incident light beams exit in the direction of the incident light beam without exception.

Figure 3:
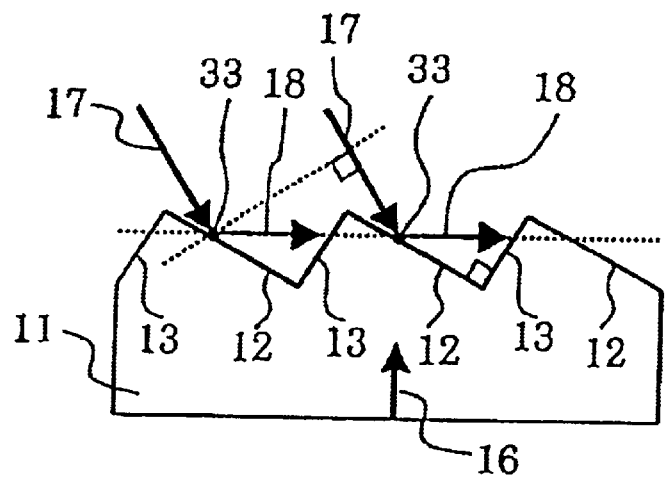
FIG. 3 is a diagrammatic illustration explaining evanescent wave in the grating configuration of the present invention.
Figure 4:
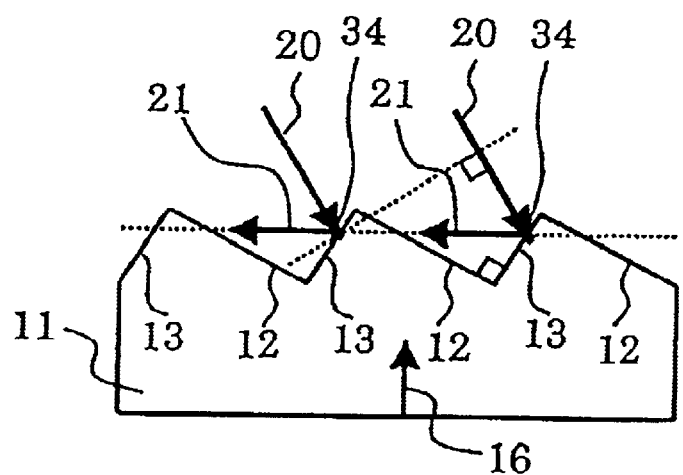
FIG. 4 is a diagrammatic illustration explaining evanescent wave in the grating configuration of the present invention.

Further, when a diffraction order is m and each of $n_1$ and $n_2$ is a whole number and when the above-mentioned incident angle φ satisfies the relationships of equations 3 and 4, the phase of a light beam (18, 21) in one groove of cyclically-formed grooves in the grating agree with the phase of a light beam (18, 21) in another groove of the cyclically formed grooves. FIGS. 3 and 4 show this state.

In FIG. 3, in a comparison of incident points (33) of incident light beams (17) on facets (12) in adjacent grooves, the relationship of the following equation 6 between a wavelength, a groove pitch and an incident angle is required for a mutual agreement between phases of light beams (18) in the adjacent grooves. In equation 6, λ is wavelength, P is a groove pitch and φ is an incident angle.

$$P(1-\sin \phi)=n_1\lambda \qquad (6)$$

In FIG. 4, in a comparison of incident points (34) of incident light beams (20) on facets (13) in adjacent grooves, the relationship of the following equation 7 is required for a mutual agreement between phases of light beams (21) in the adjacent grooves.

$$P(1+\sin \phi)=n_2\lambda \qquad (7)$$

According to the equations 5 and 6 or equations 5 and 7, the relationships of equations 3 and 4 are respectively obtained concerning an incident angle.

To summarize a series of actions in this grating configuration, retroreflection occurs in the grooves, exit light beams from respective grooves are enhanced to each other by interference effect in the direction of the incident light beam and phases of evanescent waves in the respective grooves agree with each other.

The actions occurring in this grating configuration are completely different from actions of a conventional blazed grating. The configuration characterized by the equations 1 to 4 is also completely different from a conventional configuration.

Concerning effects thereof, the reflectance of TE polarized light in a conventional blazed grating decreases when the order of diffraction is small, whereas the grating configuration of the present invention gives very high diffraction efficiencies of both TM and TE polarized lights at a low order of diffraction.

The fact that high diffraction efficiencies of both TM and TE polarized lights can be obtained at a low order of diffraction has significant meaning. As described before, there is a close relation between wavelength bandwidth: $\Delta\lambda/\lambda$ and order of diffraction: m in the grating. According to the literature 1, equation 8 is an equation showing a relation between values of the wavelength bandwidth and the diffraction order and diffraction efficiency: γ.

$$\gamma=\{\sin(m\pi\Delta\lambda/\lambda)/(m\pi\Delta\lambda/\lambda)\}^2 \qquad (8)$$

From equation 8, it is found that the wavelength bandwidth decreases in inverse proportion to the diffraction order.

In the grating configuration of the present invention, very high diffraction efficiencies of both TM and TE polarized lights can be obtained at a low diffraction order. It is assumed from the above fact that a broad wavelength bandwidth can be obtained at the same time.

The blaze angle in the conventional configuration of the blazed grating is adjusted to an angle linked by a groove pitch, wavelength and order of diffraction, that is, an incident angle in the Littrow mounting configuration.

In the blazed grating, the principal concern focuses on the groove pitch pertinent to wavelength dispersive power in most cases. Accordingly, the groove pitch is set first and then the blaze angle is set such that the first diffracted light of a certain wavelength becomes strongest. For this reason, the blaze angle is sometimes called "blaze wavelength".

The point deserving special mention concerning the relational equations 1 to 4 is as follows. The blaze angle in a common blazed grating configuration is adjusted to an angle linked by pitch, wavelength and order of diffraction, whereas the blaze angle in the grating configuration of the present invention is linked by the order of diffraction alone. In a conventional blazed grating configuration, there exists a wavelength of which the diffraction efficiency of TM polarized light increases at an incident angle in the Littrow mounting configuration which incident angle corresponds to the blaze angle, with respect to every blaze angle without exception.

In the grating configuration of the present invention, in contrast, the effect that high diffraction efficiencies of both TM and TE polarized lights can be obtained can not be obtained at a blaze angle other than a specific blaze angle linked by order of diffraction alone.

From the above point, the relational equations 1 to 4 show conditions which can give the effect that high diffraction efficiencies of both TM and TE polarized lights can be obtained. This effect is the effect of the present invention.

Regarding a substrate (35) for the grating, explained hereinbefore, used for the monochrometer (42) of the present invention, it is preferred to avoid an influence of expansion and contraction of a substrate due to a change in temperature or decrease it. From the above point, it is preferred to use silica glass or a material having a sufficiently small thermal expansion coefficient as a substrate for the grating.

Figure 5:
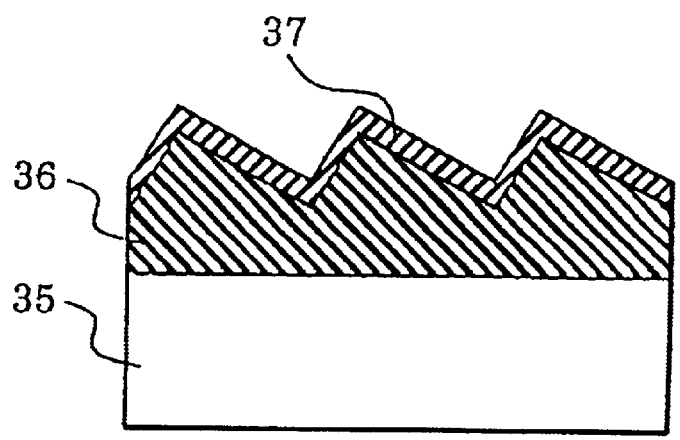
FIG. 5 is a section view showing the grating configuration typically.

In view of cost, it is preferred to use a replica transferred from a master. FIG. 5 shows an enlarged cross-sectional view of the grating prepared as above. A resin layer (36) having grooves formed exists on a substrate (35) made of silica glass or a material having a sufficiently small thermal expansion coefficient and a metal thin film (37) having a high reflectance such as gold is formed on the resin layer (36).

Next, the wavelength division multiplexer of the present invention will be explained with reference to drawings.

Figure 6:
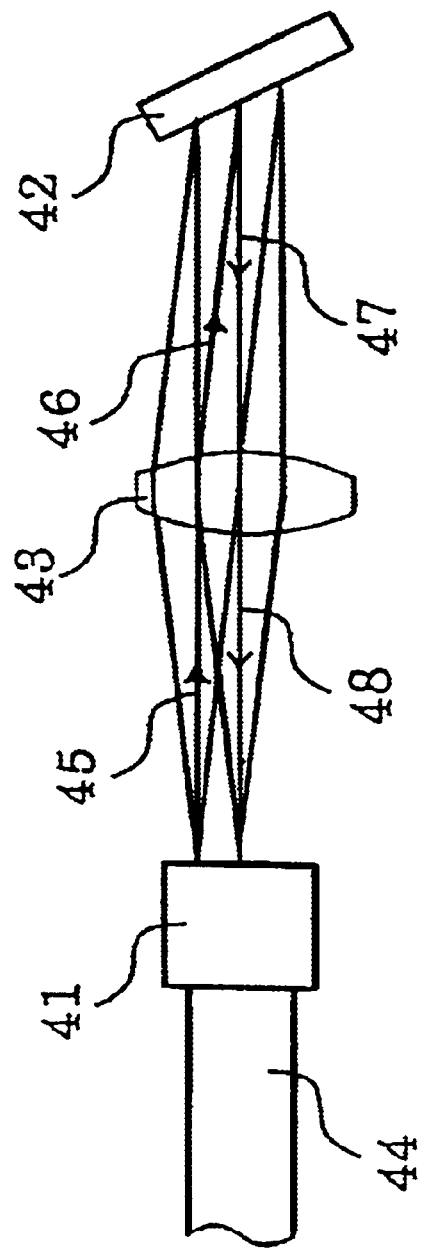
FIG. 6 is a layout illustration of the wavelength division multiplexer of the present invention

FIG. 6 shows a schematic drawing of the wavelength division multiplexer of the present invention.

The wavelength division multiplexer of the present invention comprises light input/output means (41) to a fiber tape (44) which ties optical fibers in an arrayed state, a polarization-independence type monochrometer (42) and collective means (43).

The fiber tape (44) and the light input/output means (41) are parts where light guided through an optical fiber exit to free space or light from free space is converted into a guide mode in an optical fiber. The polarization-independence type monochrometer (42) is part where light is converted into exit lights of different angles from wavelength to wavelength. The collective means (43) is a lens for converting divergent light (45) guided through an optical fiber and then emitted to free space into collimate light (46) such that the collimate light (46) enter the monochrometer (42) or for converting collimate light (47) emitted from the monochrometer (42) into convergent light (48) which can be coupled to an optical fiber.

The light input/output means (41), the monochrometer (42) and the collective means (43) are arranged such that the light input/output means (41) and the monochrometer (42) are located at a focal length point of the collective means (43) in infinite conjugated system.

In the above arrangement, each light beam entering light input/output means for each wavelength in the light input/output means (41) individually enters the light input/output means for each wavelength in a direction normal to the light input/output means. In FIG. 6, for this reason, the central axis of the divergent light (45) is parallel to the central axis of the convergent light (48). The above fact has significant meaning in respect to coupling efficiency of a beam and light input/output means for each wavelength in free space. Concerning a coupling between a beam and light input/output means for each wavelength in free space, as disclosed in "foundations and applications of optical coupling system for optical devices" (written by KONO, published by Gendai Kogakusha, p.29, to be referred to as "literature 3" hereinafter), an overlapping integral of electromagnetic field distributions of respective lights defines coupling efficiency. When a positional difference or an angle difference exists between the light input/output means and a beam, the coupling efficiency exponentially decreases with respect to the differences.

In particular, when a lens array is used for the light input/output means (41) in order to broaden the mode field diameter of a single mode fiber, a beam divergence angle decreases in inverse proportion to enlargement ratio of a beam. Accordingly, the influence of an angle difference between the light input/output means (41) and a beam in free space upon the coupling efficiency becomes extremely large. Therefore, in order to obtain high coupling efficiency it is required to decrease the angle difference exceedingly. On this account, when the light input/output means (41) and the monochrometer (42) are located at focal points of the collective means (43) in infinite conjugated system, high coupling efficiency can be obtained.

In the light input/output means (41), light input/output means to optical fibers for respective wavelengths to be combined or separated with a wavelength division multiplexer are arrayed at spacings corresponding to spacing ratio of the wavelengths. As light input/output means between the optical fiber and the free space, there is generally used a coupling at an end face of the optical fiber, while there may be used a grating coupling and the like.

In view of temperature stability of a wavelength division multiplexer, a material for the light input/output means is preferably selected from materials having a sufficiently small thermal expansion coefficient. Otherwise, silica glass or crystallized glass having a sufficiently small thermal expansion coefficient is used since the optical fiber is made of silica glass.

In the light input/output means (41), the ratio of the mode field diameter of light input/output means for each wavelength to a spacing between channels of the light input/output means (for example, a spacing between fibers of a fiber array) agrees with the ratio of wavelength bandwidth of each channel to a spacing between adjacent channels. In view of communication capability, it is preferable that a value obtained by dividing the spacing between adjacent channels by the wavelength bandwidth is small. However, in view of crosstalk between adjacent channels, it is preferable that the above value is large. Accordingly, a value obtained by dividing a spacing between adjacent light input/output means for respective wavelengths by mode field diameter of the light input/output means is preferably selected from the range of from 1.5 to 2.5.

However, the fiber diameter of a common single mode fiber is 125 μm and the mode field diameter of the single mode fiber nearly agrees with the core diameter of the single mode fiber and is approximately 10 μm. In the case of a densely arranged fiber array, a value obtained by dividing a spacing between adjacent single mode fibers by a mode field diameter is 12.5 and this value is five or more times larger than a value in the proper range.

For the above reason, there is required a contrivance for improving the above ratio.

One contrivance is a method in which the mode field diameter of light input/output means at each wavelength is enlarged with a lens. When a coupling at an end face of a single mode fiber is considered, an electric field distribution at an end face is nearly a Gauss type distribution. The mode field diameter is approximatively equal to the beam waist diameter of Gaussian light beam.

As disclosed in the literature 3 (page 50), the beam waist diameter may be modulated by means of a lens. When such a microlens array is arranged for a fiber array, there can be formed light input/output means wherein a value obtained by dividing each fiber spacing in the fiber array by a beam waist diameter is 1.5~2.5.

A refractive index distribution type lens may be used as the above lens used for converting the beam waist diameter. In particular, a graded index multimode optical fiber has a square (quadratic) type distribution form of the refractive index distribution. When the graded index multimode optical fiber is coupled with a single-mode optical fiber at an end face, the beam diameter repeats convergence and divergence cyclically. The beam diameter has the largest diameter at just a length of an odd multiple of one-half the length of the above one cycle. That is, a multimode optical fiber having such a length has the function of converting a beam waist diameter. Regarding the length of a multimode optical fiber, it is difficult to handle it when a multimode fiber array is too short, and a module size increases when a multimode fiber array is too long. Therefore, it is possible to select a length suitable for a connection between both the fiber arrays.

As another contrivance, a waveguide array in which waveguides are formed at one end face such that the waveguides have the same spacing as a spacing between fibers in a fiber array and at the other end face, waveguides are formed at such spacings that a value obtained by dividing a spacing between the waveguides by mode field diameter of the waveguide is 1.5~2.5, is connected to the fiber array, whereby light input/output means can be formed.

The monochrometer (42) of the present invention is explained before.

Regarding the collective means (43), the collective means (43) is required to have a sufficient aperture through which an emitted light beam from the light input/output means (41) passes and then, after the light beam enters the monochrometer (42) and the light beam is diffracted, through which light beam passes again. Concurrently, the collective means (43) is required to have such collective properties that a light beam from the collective means (43) can be coupled to light input/output means for each wavelength in the light input/output means (41) with sufficient efficiency. Decreasing mainly abaxial aberration of lens properties can actualize the above collective properties. A lens is designed to decrease the abaxial aberration. A suitable lens configuration capable of sufficiently decreasing the abaxial aberration varies depending upon the number of wavelengths to be multiplexed, etc. As the collective means (43), there may be used a refraction type lens and a reflection type lens.

The collective means (43) can obtain a sufficient coupling efficiency by adopting a properly designed doublet configuration composed of two spherical lenses when the number of wavelengths is small. When the number of wavelengths is large, the collective means (43) is composed of three or more spherical lenses or a singular lens having an aspheric form or a plurality of lenses having an aspheric form.

There are known many methods for carrying out a simulation for optical properties of a grating form like the present invention. It is known that simulation results thereof sufficiently accurately agree with actual property measurement results of a product within each application range.

As one of the above simulation means, P. M. van den Berg, Journal of the Optical Society of America, Vol.71, No.10, pp 1224–1229 (1981) (to be referred to as "literature 4" hereinafter), discloses a diffraction efficiency calculation method called "Rayliegh method". The Rayliegh method is a method in which, when a grating surface is a complete conductor, an analysis solution of electromagnetic wave generated by a grating is represented by a series composed of each diffracted wave which can exit from the grating propagated wave and an evanescent wave which can not exit from the grating, and the complex amplitudes of the diffracted wave and the evanescent wave are decided such that these electromagnetic waves satisfy a boundary condition on the grating surface. It is verified that, when the above series is converged, it converges on the above analysis solution.

Further, it is assumed that the assumption of "complete conductor" in the above electromagnetic wave analysis holds with sufficient consistency while a material having a very high reflectance to infrared rays, such as gold, is used as the material of the grating surface and infrared light is used thereto.

The present inventors analyzed the grating configuration used in the present monochrometer for diffraction efficiency of each of TE and TM polarization components according to the simulation method of the literature 4. Table 1 shows analysis results concerning an incident light having a wavelength of 1.55 μm.

In Table 1, Nos. 1 to 12 are the monochrometer configuration of the present invention and Nos. 13 to 15 are comparative examples in which equations 1 and 2 were satisfied but equations 3 and 4 were not satisfied. In each of Nos. 1 to 12, both diffraction efficiencies of TM and TE polarized lights were 100%. In these cases, a series formed of a diffracted wave and evanescent wave was converged so that it was confirmed that sufficient calculation accuracy was obtained in this simulation. Further, since the diffraction efficiencies were 100% each, it can be estimated that a configuration which concurrently satisfies equations 1 to 4 is an analysis solution by which both TM and TE polarized lights can have diffraction efficiency of 100%.

In contrast, in each of Nos. 13 to 15, diffraction efficiency of TE polarized light was low, that is, it was 60% or lower.

TABLE 1

| No. | Equations 3 and 4 m | Equation 3 $n_1$ | Equation 4 $n_2$ | Blaze angle [deg] | Groove pitch | Incident angle [deg] | Diffraction efficiency of polarization TM | TE |
|---|---|---|---|---|---|---|---|---|
| 1 | 1 | 1 | 2 | 35.3 | 430 | 19.5 | 100 | 100 |
| 2 | 2 | 1 | 3 | 30.0 | 323 | 30.0 | 100 | 100 |
| 3 | 1 | 2 | 3 | 39.2 | 258 | 11.5 | 100 | 100 |
| 4 | 2 | 2 | 4 | 35.3 | 215 | 19.5 | 100 | 100 |
| 5 | 3 | 2 | 5 | 32.3 | 184 | 25.4 | 100 | 100 |
| 6 | 4 | 2 | 6 | 30.0 | 161 | 30.0 | 100 | 100 |
| 7 | 1 | 3 | 4 | 40.9 | 184 | 8.2 | 100 | 100 |
| 8 | 2 | 3 | 5 | 37.8 | 161 | 14.5 | 100 | 100 |

TABLE 1-continued

| No. | Equations 3 and 4 m | Equation 3 $n_1$ | Equation 4 $n_2$ | Blaze angle [deg] | Groove pitch | Incident angle [deg] | Diffraction efficiency of polarization TM | TE |
|---|---|---|---|---|---|---|---|---|
| 9 | 3 | 3 | 6 | 35.3 | 143 | 19.5 | 100 | 100 |
| 10 | 4 | 3 | 7 | 33.2 | 129 | 23.6 | 100 | 100 |
| 11 | 5 | 3 | 8 | 31.5 | 117 | 27.0 | 100 | 100 |
| 12 | 6 | 3 | 9 | 30.0 | 108 | 30.0 | 100 | 100 |
| 13 | 1 | 0.5 | 1.5 | 30.0 | 645 | 30.0 | Uncomfirmed | 60 or lower |
| 14 | 3 | 1.5 | 4.5 | 30.0 | 215 | 30.0 | Uncomfirmed | 60 or lower |
| 15 | 5 | 2.5 | 7.5 | 30.0 | 129 | 30.0 | Uncomfirmed | 60 or lower |

Note: Groove pitch: lines/mm

Effect of the Invention

According to the present invention, there can be provided a small-sized and low-cost monochrometer having little polarization dependence and a broad wavelength bandwidth. Accordingly, concerning a wavelength division multiplexer used in a WDM optical transmission system which conducts communications by sending and receiving a wavelength division multiplexing (WDM) signal obtained by combining optical signals of a plurality of wavelengths, there can be provided a small-sized and low-cost wavelength division multiplexer having little insertion loss, little polarization dependence and a broad wavelength bandwidth.

What is claimed is:

1. A monochrometer comprising a grating, in which an incident angle of light entering said grating agrees with an exit angle of a diffracted light exiting said grating, wherein
said grating is composed of a plane substrate and linear grooves constructed of two facets,
said linear grooves are formed on said plane substrate in regular cycles,
the three angles of $\theta a$, $\theta b$ and $\phi$ satisfy the relationships of the following equations 1 and 2 in which $\theta a$ is the angle that the normal line to one facet of the two facets of each groove forms with the normal line to the surface of said plane substrate, $\theta b$ is the angle that the normal line to the other facet of the two facets of each groove forms with the normal line to the surface of said plane substrate, and $\phi$ is the incident angle which light entering said grating forms with the normal line to the surface of said plane substrate, and
said incident angle $\phi$ satisfies the following equations 3 and 4 in which m is the order of diffraction and each of $n_1$ and $n_2$ is a whole number:

$$\theta a = \pi/4 + \phi/2 \tag{1}$$

$$\theta b = \pi/4 - \phi/2 \tag{2}$$

$$\sin \phi = m/(2n_1 + m) \tag{3}$$

$$\sin \phi = m/(2n_2 - m) \tag{4}$$

2. A wavelength division multiplexer for use in a wavelength division multiplexing (WDM) optical transmission system which conducts communications by sending and receiving a wavelength division multiplexing (WDM) signal obtained by combining optical signals of a plurality of wavelengths, which wavelength division multiplexer comprises light input/output means to a fiber, the monochrometer recited in claim 1, and collective means disposed on an optical path between said light input/output means and the monochrometer.

* * * * *